United States Patent Office 2,782,799
Patented Feb. 26, 1957

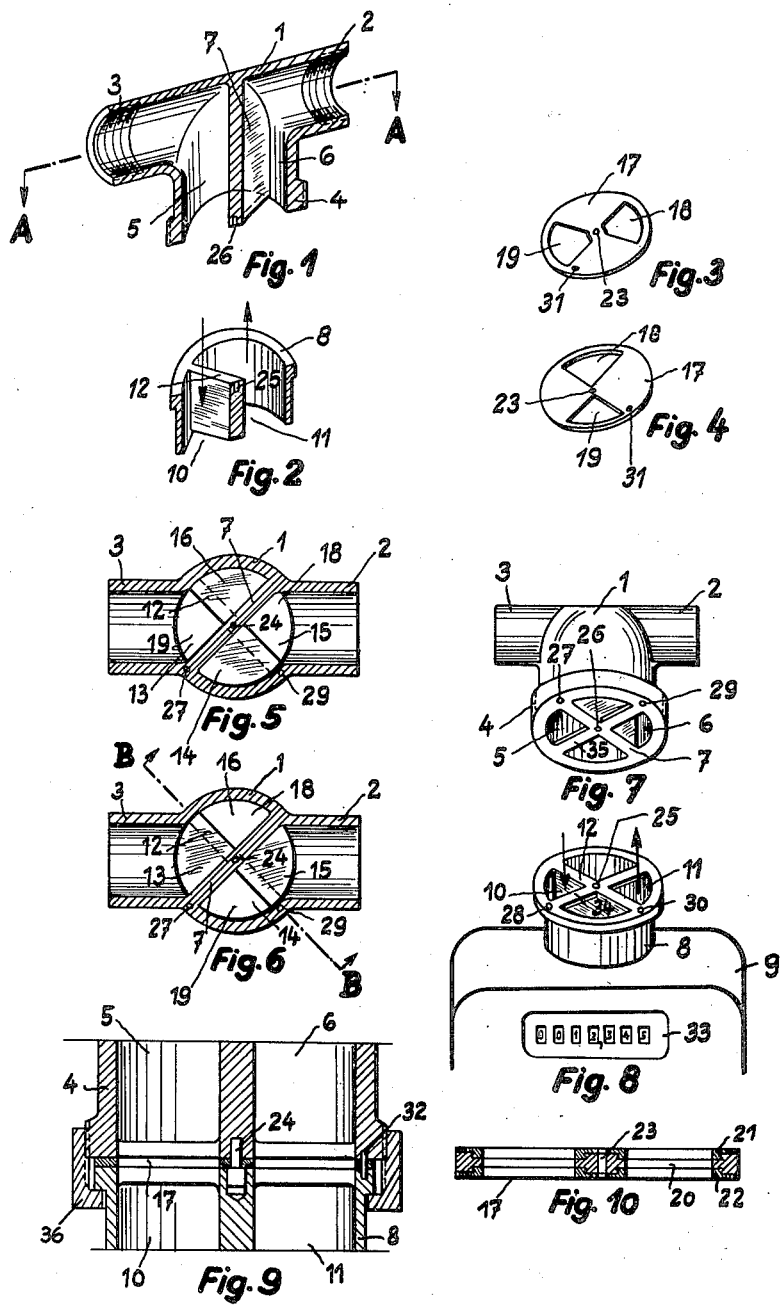

2,782,799
PIPE JOINTS FOR PIPE SYSTEMS AND LIKE FLUID HANDLING ARRANGEMENTS

Wilhelm Vobbe, Osnabruck, Germany, assignor to G. Kromschroder Aktiengesellschaft, Osnabruck, Germany Application July 20, 1955, Serial No. 523,264

Claims priority, application Germany July 26, 1954

10 Claims. (Cl. 137—608)

This invention relates to pipe couplings for use with fluid flow-responsive devices of special constructions.

It is one of the objects of the present invention to provide means facilitating introduction of a fluid or gas stream through channels or ducts of a pipe coupling of a pipe system, selectively, in one or another direction in accordance with the practical requirements which such pipe system imposes.

It is another object of the present invention to provide means facilitating easy installation of pipe coupling means having divided channels or ducts into a pipe system, as well as ready adaptation of such coupling means to the respective divided channels or passageways of a fluid flow-responsive device to be connected to the pipe system.

Another important object of the present invention is to provide means contributing to an extremely simple, inexpensive and easily manipulatable pipe connection, which may be readily combined with auxiliary means to enable the direction of flow of a fluid through a device joined to said pipe connection to be predetermined regardless of the direction of flow of said fluid through said connection.

Yet another object of the present invention is to provide means ensuring highly effective seal tightness in pipe joints or couplings while the same are in use in gas or other fluid handling conduits in which safety measures are of extreme importance.

More particularly, this invention is directed to a pipe coupling arrangement for connecting into a pipe line fluid flow-responsive devices or instruments, such as gas meters, and especially meters having a pair of inlet and outlet ducts arranged in side by side relation within a common double-conduit nipple. Such connection is normally accomplished by means of a pipe coupling element which is likewise provided with a double-conduit nipple defining two channels or ducts terminating next to each other. Both of these latter ducts or channels communicate with two connecting ends of the pipe coupling by means of which the latter is structurally incorporated in the pipe line.

Many such instruments, especially pressure regulators and meters, may be so constructed as to permit fluid flow therethrough in only one direction. In other words, in these instruments it is predetermined which of the two openings of the double-conduit nipple is the inlet opening and which is the outlet opening.

It has often, however, been found to be difficult to adapt such instruments during their installation to the physical layout of the pipe line and other surrounding structures. In most cases, the two factors or operating conditions of direction of fluid flow and orientation of the indicating or reading face of the meter are preset. By way of example, the flow may be arranged to take place from left to right through the pipe line, while the meter through which the fluid flows must, of course, have its indicating face disposed for easy viewing and access, i. e., away from the wall supporting the meter and the pipe line.

These two factors or conditions cannot always be simultaneously met if, for example, with a pipe line flow direction from left to right, a meter is employed which is designed to have the fluid flow therethrough from right to left when the indicating face is operationally and viewably arranged.

In order to eliminate these difficulties it has already been proposed to incorporate between the pipe coupling and the instrument an intermediate element with a screw-like or helical conduit or channel by means of which the right or left hand channel of the pipe coupling can be selectively connected with the meter inlet duct.

Apart from the fact that such an intermediate element is of complex construction, relatively expensive and very difficult to manufacture, use of such an element entails the considerable disadvantage that an additional seal provision must be made between the fluid which has already flown through the meter or regulator and the fluid which has not yet passed through said meter or regulator.

According to the invention, the object of which is primarily to avoid these disadvantages and drawbacks, the basic arrangement is such that the partitions separating the respective duct or channel pairs of the double-conduit nipples of the meter and the pipe coupling cross each other and that a sealing cover or intermediate plate provided with two openings is inserted between the two nipples.

The function of this cover plate is to establish communication, selectively, between the inlet of the meter and one or the other of the conduits or ducts in the pipe coupling. Preferably, the planes of the two partitions intersect each other at right angles, while the cover plate openings are diagonally opposed to each other and are substantially quadrantal in shape.

The sealing area between the nipples is, in this manner, divided into four sectors. One sector lies between the meter inlet and the left hand conduit of the pipe coupling, while a second sector lies between the meter inlet and the right hand coupling conduit. A third sector is defined between the meter outlet and the right hand conduit of the coupling, while the fourth sector is defined between the meter outlet and the left hand coupling conduit.

When, as a consequence of the physical layout of the pipe line, the fluid flows from left to right in said pipe line and through said coupling, the cover plate is so inserted between the nipples that the two openings in the plate coincide with the first and third sectors set forth above. Should the fluid flow from right to left in the pipe line and through the coupling, then the cover plate is rotated about its axis through an angle of 90° so that the corresponding openings coincide with the second and fourth of the above mentioned sectors. Preferably, the cover plate consists at least partially of elastic material so that it may simultaneously function as a sealing plate.

These and other objects and advantages of the invention will become further apparent from the following detailed description, reference being made to the accompanying drawing, showing preferred embodiments of the invention.

In the drawing:

Fig. 1 is a sectional isometric view of a pipe coupling with a double-conduit nipple made according to the present invention;

Fig. 2 is a sectional isometric view of a double-conduit nipple of a flow-responsive instrument to be connected to the aforesaid pipe coupling;

Fig. 3 shows a cover plate for insertion between the nipple of Fig. 1 and the nipple of Fig. 2, the plate being oriented to accommodate fluid flow from left to right through the coupling;

Fig. 4 shows the aforesaid cover plate oriented to accommodate flow from right to left through the coupling;

Fig. 5 is a sectional view taken along the line A—A in Fig. 1 and illustrates the cover plate in the position seen in Fig. 3;

Fig. 6 is a similar sectional view taken along the line A—A in Fig. 1 and illustrates the cover plate in the position seen in Fig. 4;

Fig. 7 shows a modified form of pipe coupling;

Fig. 8 shows schematically a gas meter with double-conduit nipple for connection to the coupling of Fig. 7;

Fig. 9 is a sectional view taken along the line B—B in Fig. 6; and

Fig. 10 is a sectional view of a cover plate assembly.

Referring now to Fig. 1, the pipe coupling 1 comprises a substantially cylindrical body portion having connecting ends or nipples 2 and 3 which are to be connected, respectively, with a pipe line. Extending substantially at right angles from the cylindrical body of the coupling 1 is a double-conduit nipple 4 provided with two adjacent conduits or ducts 5 and 6 separated by a wall or partition 7. The duct 5 communicates with the end nipple 3 whereas duct 6 communicates with the end nipple 2. The partition 7 is preferably arranged at an angle of 45° to the common axis of the connecting ends or nipples 2 and 3.

A double-conduit nipple 8 of a fluid flow-responsive device, such as a gas meter 9, is constructed for connection with the nipple 4 of the coupling 1. The nipple 8 is also provided with two adjacent ducts or conduits 10 and 11 separated by a wall or partition 12.

As may be seen from the arrows in Fig. 2, the duct 10 serves as the inlet to the meter while the duct 11 serves as the outlet from the meter. When the nipple 8 is correctly connected to the nipple 4, as by means of a cap nut 36 (see Fig. 9), the partition 12 is disposed at right angles to the partition 7.

The contact area between the two double-conduit nipples 4 and 8 thus is divided into four sectors 13, 14, 15 and 16. The sector 13 lies between the meter inlet duct 10 and the duct 5 of the pipe coupling, the sector 14 between the inlet duct 10 and the coupling duct 6, the sector 15 between the outlet duct 11 and the coupling duct 6, and the sector 16 between the outlet duct 11 and the coupling duct 5.

A sealing cover plate 17 is interposed between the nipples 4 and 8 upon connection of the meter to the coupling. The cover plate 17 is formed with two diagonally opposed quadrantal openings 18 and 19. The cover plate preferably consists of a metallic plate 20 provided on both surfaces with sealing covers or coatings 21 and 22.

In the center of the cover plate there is provided a hole or aperture 23 through which a centering pin 24 may be inserted, the opposite ends of the pin 24 extending into correspondingly shaped bores or recesses 25 and 26 provided in the partitions 12 and 7, respectively.

The two double-conduit nipples 4 and 8 are also provided, respectively, with guide recesses or bores 27, 29 and 28, 30, each pair of these bores being spaced 90° along the circumference of the corresponding double-conduit nipple. A guide pin 32 (see Fig. 9) which extends through an aperture 31 in the cover plate 17 is constructed to have its ends received either in the oppositely located guide bores 27, 28 or in the oppositely located guide bores 29, 30.

As will be readily realized, the gas meter 9 must be so connected to the pipe line that the counter 33 is readily accessible for viewing purposes. The direction in which the meter may be traversed by the flowing fluid, e. g. gas, is, of course, ordinarily predetermined by the manufacturer (see the arrows in Fig. 2).

Thus, if the gas flows into the coupling 1 from the left through the nipple 3, then the cover plate 17 arranged between the nipple 4 of the coupling 1 and the nipple 8 of the meter 9 must be oriented in the position shown in Figs. 3 and 5. The opening 19, in this eventuality, coincides with the sealing area sector 13 and provides a flow path from the end nipple 3 through the duct 5 and into the meter inlet duct 10, while the sector 14 between the coupling duct 6 and the meter inlet 10 is covered and closed.

Simultaneously, the opening 18 coincides with the sector 15 and provides a flow path from the meter outlet duct 11 through the coupling duct 6 to the coupling end nipple 2. The sector 16 between the outlet duct 11 and the coupling duct 5 is closed at this time.

Should the gas flow take place from the right, as seen in Fig. 1, however, then the position of the cover plate 17 must be changed by 90° without any change in the relative positions of the coupling 1 and the meter 9. In this event, openings 18 and 19 coincide with the sectors 16 and 14 (see Figs. 4 and 6) and provide flow paths between the coupling duct 6 and the meter inlet duct 10 and between the meter outlet duct 11 and the coupling duct 5, respectively.

Centering of the cover plate 17 is, of course, greatly facilitated by the use of the guide pin 24, while the angular position of the cover plate may be easily predetermined by means of the guide pin 32. The intermediate or cover plate, besides functioning as a flow gate, also serves by virtue of its coatings 21 and 22 as a seal for the junction between the double-conduit nipples 4 and 8.

In order to effect complete sealing action between the nipples 4 and 8, both of the latter may be provided with cross pieces or bars 35 and 34, respectively, arranged at right angles to the partitions 7 and 12 and having their outer surfaces coplanar with the outer surfaces of said partitions (see Figs. 7 and 8). The edges of each cross bar are, of course, accurately aligned with the edges of the partition in the other nipple, whereby the cover plate 17 may be fully pressed against the sealing surfaces of the two nipples.

Thus it will be seen that there has been provided, in accordance with the present invention, a pipe joint for pipes of a pipe system, comprising a first double-conduit nipple forming part of one pipe and provided with first ducts, first partition means within said first double-conduit nipple and defining said first ducts, a second double-conduit nipple constructed for connection with said first double-conduit nipple and provided with second ducts, second partition means within said second double-conduit nipple and defining said second ducts, said first partition means extending in angular relation to said second partition means in connected position of said nipples, intermediate means interposed between both said double-conduit nipples and provided with passageways, and means arranged on said intermediate means to facilitate adjustment of said passageway relative to said ducts of both said double-conduit nipples and to thereby direct fluid flow through said ducts and said passageways in a predetermined path.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A pipe joint for pipes of a pipe system, comprising a first double-conduit nipple forming part of one pipe and provided with first ducts, first partition means within said first double-conduit nipple and defining said first ducts, a second double-conduit nipple constructed for connection with said first double-conduit nipple and provided with second ducts, second partition means within said second double-conduit nipple and defining said second ducts, said first partition means extending in angular relation to said second partition means in connected position of said nipples, intermediate means interposed between both said double-conduit nipples and provided with passageways, and means arranged on said intermediate means to facilitate adjustment of said passageways relative to said ducts of both said double-conduit nipples and to thereby direct fluid flow through said ducts and said passageways in a predetermined path.

2. A joint according to claim 1, wherein said partition means extend at right angles to each other.

3. A joint according to claim 1, said intermediate means comprising plate means and being provided with diagonally opposite passageways shaped for registry with said ducts of said double-conduit nipples.

4. A joint according to claim 1, including cross-pieces extending substantially coplanar with the ends of said partition means to thereby aid in sealing said nipples at the junction thereof.

5. A joint according to claim 4, wherein the cross-piece of one nipple is positioned opposite corresponding partition means of the other nipple.

6. A joint according to claim 1, said intermediate means being plate-shaped and being provided with at least one surface of fluid-sealing material.

7. A joint according to claim 1, said intermediate means being substantially made of elastic material.

8. A joint according to claim 1, said partition means being provided with centering means to thereby determine the position of said intermediate means relative to said nipples, and means on said intermediate means to adjust the latter relative to said partition means.

9. A pipe joint for pipes of a pipe system, comprising a first double-conduit nipple forming part of one pipe, first partition means within said first double-conduit nipple and defining first ducts therewithin, a second double-conduit nipple forming part of another pipe and constructed for connection at one end with a corresponding end of said first double-conduit nipple, second partition means within said second double-conduit nipple and defining second ducts therewith, said first partition means extending substantially at right angles to said second partition means when said nipples are connected to each other, an intermediate plate disposed between both said double-conduit nipples upon interconnection of the same and provided with diagonally opposite openings, a first pair of guide bores in said end of said first nipple and spaced 90° from each other along the circumference of said first nipple, a second pair of guide bores in said end of said second nipple and spaced 90° from each other along the circumference of said second nipple, said first bores being located opposite said second bores, respectively, upon connection of said ends of said nipples, and a guide pin arranged on said intermediate plate and projecting from the opposite faces thereof with its opposite ends engaging one of said guide bores on each of said nipples for adjustment of said openings relative to said ducts of both said double-conduit nipples, whereby the direction of fluid flow through said ducts and said openings may be predetermined through selective engagement of said guide pin with one or another pair of said opposed guide bores.

10. A joint according to claim 9, said first partition means being provided with a first central recess, said second partition means being provided with a second central recess, and a centering pin arranged centrally on said plate and projecting from the opposite faces thereof with its opposite ends engaging said recesses, respectively, whereby said plate may be accurately centered with respect to both said nipples.

No references cited.